United States Patent [19]

Eguchi

[11] Patent Number: 5,038,220
[45] Date of Patent: Aug. 6, 1991

[54] METHOD AND APPARATUS FOR SIMULTANEOUSLY RECORDING TWO INDEPENDENT VIDEO SIGNALS

[75] Inventor: Takeo Eguchi, Kanagawa, Japan

[73] Assignee: Sony Corporation, Tokyo, Japan

[21] Appl. No.: 380,505

[22] Filed: Jul. 17, 1989

[30] Foreign Application Priority Data

Aug. 29, 1988 [JP] Japan ................. 63-215849

[51] Int. Cl.⁵ ............................................. H04N 9/80
[52] U.S. Cl. ..................................................... 358/310
[58] Field of Search ................. 358/310, 330, 334, 11, 358/12

[56] References Cited

U.S. PATENT DOCUMENTS 4,574,300  3/1986  Hulyer ................................. 358/12
4,812,920  3/1989  Nagashima et al. ................. 358/310

*Primary Examiner*—Donald McElheny, Jr.
*Attorney, Agent, or Firm*—Alvin Sinderbrand; William S. Frommer

[57] ABSTRACT

A method for recording and reproducing a color video signal having a luminance signal and two difference chroma signals together with a key signal by means of two video tape recorders which are synchronously driven comprises the steps of dividing the two difference chroma signals so as to obtain respective high and low frequency components, recording a first video signal including the luminance signal and the respective low frequency components of the two difference chroma signals, recording a second video signal including the key signal and the respective high frequency components of the two difference chroma signals, both the first and second video signals being recorded in a format for 4:2:2 digital video signal processing by using a 4:2:2 type video tape recorder for each of the first and second video signals, respectively, reproducing the first and second video signals, and combining the reproduced first and second video signals so as to obtain the color video signal and the key signal.

11 Claims, 4 Drawing Sheets

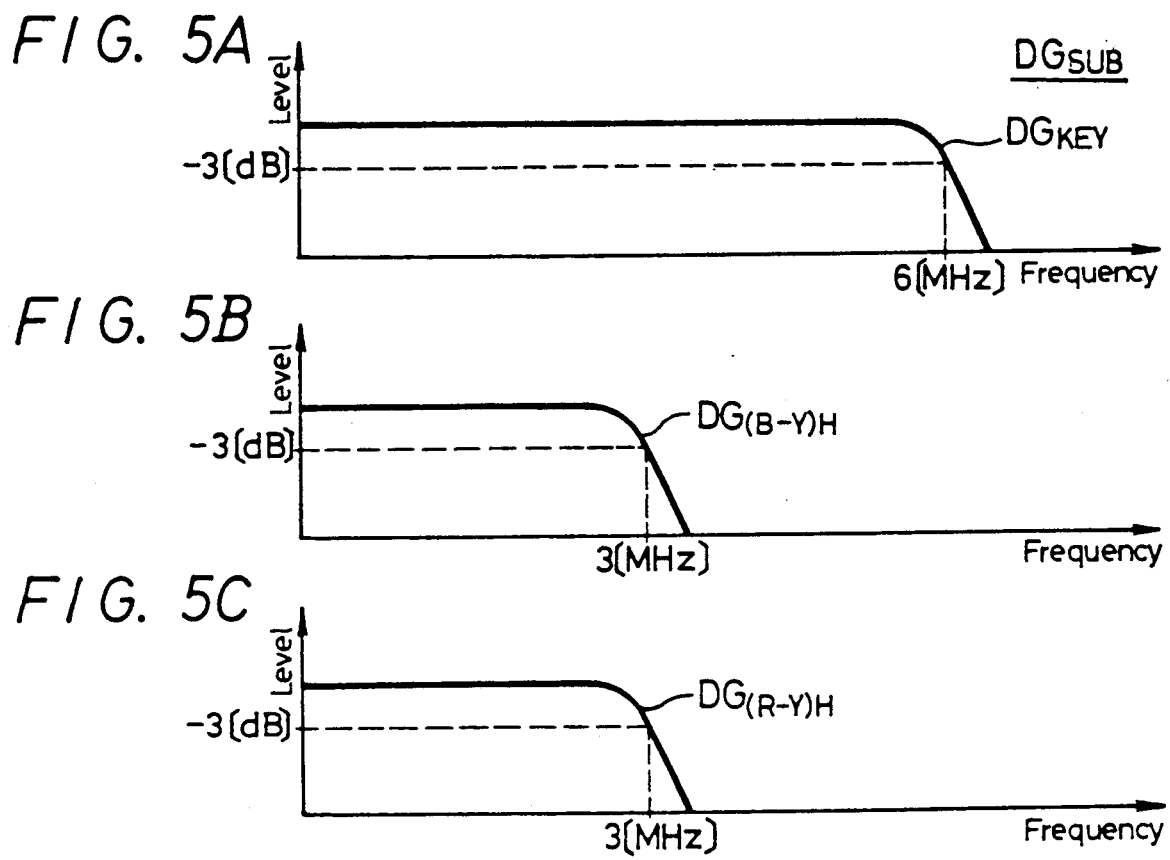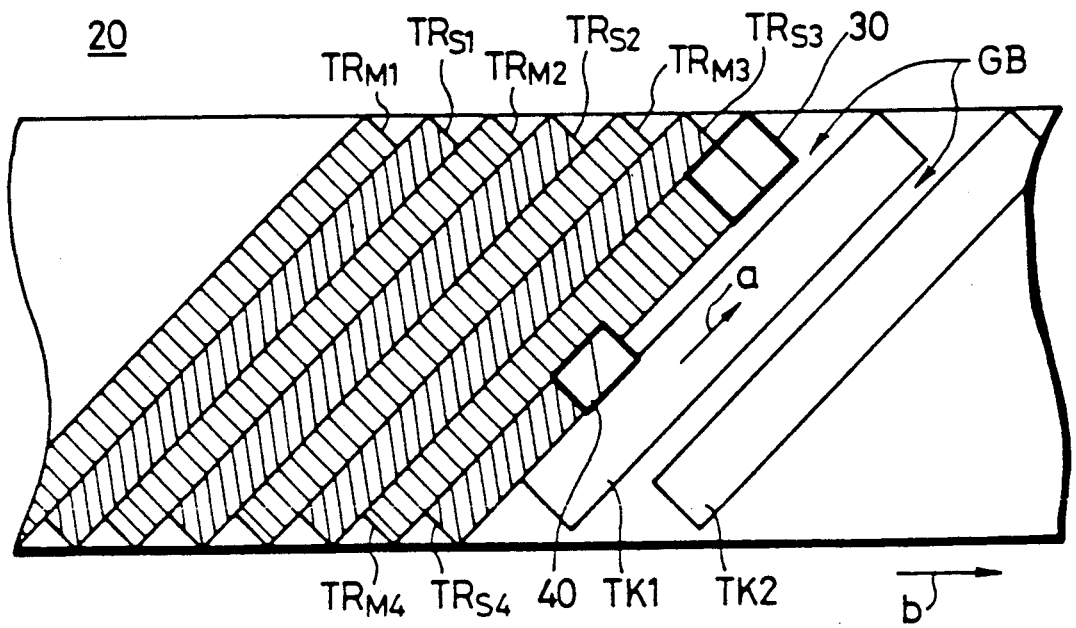

METHOD AND APPARATUS FOR SIMULTANEOUSLY RECORDING TWO INDEPENDENT VIDEO SIGNALS

BACKGROUND OF THE INVENTION

1. Field of the Invention

The present invention relates generally to a method of recording and reproducing a color video signal and to a digital video tape recorder. More particularly, this invention relates to a digital video tape recorder for recording and reproducing a color video signal which is compatible with a conventional digital video tape recorder with a format of 4:2:2 type while keeping a double recording capacity.

2. Description of the Prior Art

There is known a digital video tape recorder for recording and reproducing a digital color video signal in 4:2:2 formatted digital video signal processing. FIGS. 1A to 1C illustrate this digital video processing. As the digital video data $D_{VDS}$ a luminance signal Y is sampled at a sampling frequency of 13.5 MHz and two difference chrominance signals B-Y and R-Y are sampled at a sampling frequency of 6.75 MHz, which is half of that luminance signal. A digital signal $D_Y$ formed of the luminance signal is recorded in the signal band of 6 MHz (5.75 MHz in practice). The digital signals $D_{B-Y}$ and $D_{R-Y}$ formed of the two difference chrominance signals B-Y and R-Y are recorded in the signal band of 3 MHz (2.75 MHz in practice).

When the digital video tape recorder based on of 4:2:2 format digital video signal processing is used to produce a picture in a broadcasting station or in production, the digital signals $D_{B-Y}$ and $D_{R-Y}$ formed of the two difference chrominance signals B-Y and R-Y are recorded in the signal band of 3 MHz, which is a half of that of the digital signal $D_Y$ formed of the luminance signal. When the picture is edited by using a chromakey method, a satisfactory efficiency can not be demonstrated.

Further, according to the format of 4:2:2 type digital video signal processing, only the luminance signal the digital signals $D_Y$ and $D_{B-Y}$ and $D_{R-Y}$ formed of the two difference chrominance signals are recorded on the magnetic tape. In practice a key signal or the like for achieving a special effect can not be recorded thereon. Therefore, in the production of pictures, the key signal is recorded by another video tape recorder using a complicated method causing complicated and cumbersome work.

In order to solve the above-mentioned problems, a so-called 4:4:4:4 format digital video tape recorder is proposed, in which the luminance signal, the difference chrominance signals R-Y and B-Y and the key signal for specical effect are recorded and reproduced in the same signal band. For example, a system for recording and reproducing the three color signals R, G, B and the key signal in the same in frequency band by a single video tape recorder is proposed.

In the digital video tape recorder which directly records on a magnetic tape video data of 4:4:4:4 type digital video processing format, it is difficult to maintain a compatibility with the prior-art digital video tape recorder of 4:2:2 format digital video signal processing and the above-mentioned problems are not yet solved.

OBJECTS AND SUMMARY OF THE INVENTION

It is an object of the present invention to provide an improved method for recording and reproducing a color video signal which can remove the above-mentioned defects inherent in the prior-art method.

It is another object of the present invention to provide a method for recording and reproducing a color video signal in which a color video signal can be recorded and reproduced by using two conventional 4:2:2 type digital video tape recorders without using a new digital video tape recorder.

It is still another object of the present invention to provide an apparatus for recording and reproducing a color video signal having a compatibility with a conventional 4:2:2 type digital video tape recorder format and which has a recording capacity twice as large as that of the conventional 4:2:2 type digital video tape recorder.

According to an aspect of the present invention, there is provided a method for recording and reproducing (1) a color video signal having a luminance signal and a plurality of difference chrominance signals having a equivalent frequency band width equivalent to that of the luminance signal, and (2) an independent video signal which is different from the color video signal, comprising the steps of:

(a) dividing each of said difference chrominance signals so as to obtain low and high frequency components;

(b) generating a first video signal having said luminance signal and said low frequency components of said difference chrominance signals, and a second video signal having the independent video signal and the high frequency components of said difference chrominance signals;

(c) recording said first and second video signals by using first and second video tape recorders respectively which are synchronously driven;

(d) reproducing said first and second video signals by said first and second video tape recorders respectively; and (e) combining said reproduced first and second video signals so as to regenerate said color video signal and the independent video signal.

According to another aspect of the present invention, there is provided an apparatus for recording and reproducing a color video signal having a luminance signal and a plurality of difference chrominance signals having a frequency band which equivalent to the same of the luminance signal, and an independent video signal which is different from the color video signal, comprising:

(A) means for dividing a frequency band of each of the plurality of difference chrominance signals to generate first and second sets of difference chrominance signals, the first set including a low frequency component of each of the plurality of difference chrominance signals and the second set including a high frequency component of each of the plurality of difference chrominance signals;

(B) means for generating a first video signal having the luminance signal and the first set of difference chrominance signals and a second video signal having the independent video signal and the second set of difference chrominance signals.

(C) first and second video tape recorders for recording and reproducing the first and second video signals, respectively; and (D) means for combining the first and second video signals reproduced by said first and second video tape recorders, respectively.

According to a further aspect of the present invention, there is provided an apparatus for recording and reproducing (1) a color video signal having a luminance signal and a plurality of difference chrominance signals having a frequency band which is equivalent to the frequency band of the luminance signal, and (2) an independent video signal which is different from the color video signal, comprising:

(1) means for dividing a frequency band of each of the plurality of difference chrominance signals to generate first and second sets of difference chrominance signals, the first set including a low frequency component of each of the plurality of difference chrominance signals and the second set including a high frequency component of each of the plurality of difference chroma signals;

(2) means for generating a first video signal having the luminance signal and the first set of difference chrominance signals and a second video signal having the independent video signal and the second set of difference chrominance signals;

(3) a video tape recorder for recording and reproducing the first and second video signal on a magnetic tape; and (4) means for combining the first and second video signals reproduced by said video tape recorder said video tape recorder including a rotary drum having first and second recording heads and reproducing heads so that said first video signal is recorded on the magnetic tape by said first recording head to produce successive oblique first video tracks with a guard band area between said successive first video tracks, and so that said second video signal is recorded on said guard band area on the magnetic tape by said second recording head as second video tracks, wherein said first and second video signals are reproduced by said first and second reproducing heads, respectively.

These and other objects, features and advantages of the present invention will be apparent in the following detailed description of preferred embodiments when read in conjunction with the accompanying drawings, in which like reference numerals are used to represent the same or similar parts in the several views.

BRIEF DESCRIPTION OF THE DRAWINGS

FIGS. 5A to 5C are schematic diagrams of a format of 4:2:2 sub signal system, respectively; and FIG. 6 is a diagrammatic view of a section of a magnetic tape illustrating recorded tracks thereon and used to explain the operation of the present invention.

DETAILED DESCRIPTION OF PREFERRED EMBODIMENTS

Figure 1A:
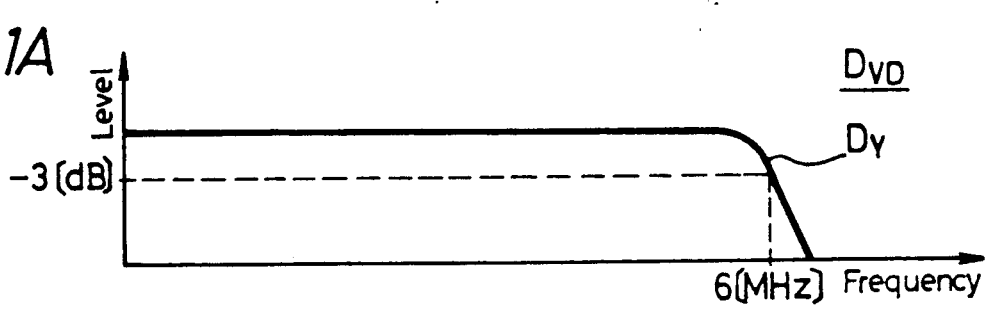
FIGS. 1A to 1C each are characteristic diagrams used to explain a format of 4:2:2 type digital video tape recorder.
Figure 1B:
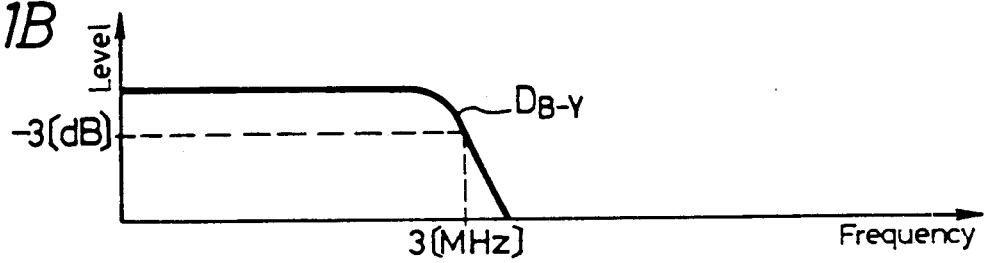
Figure 1C:
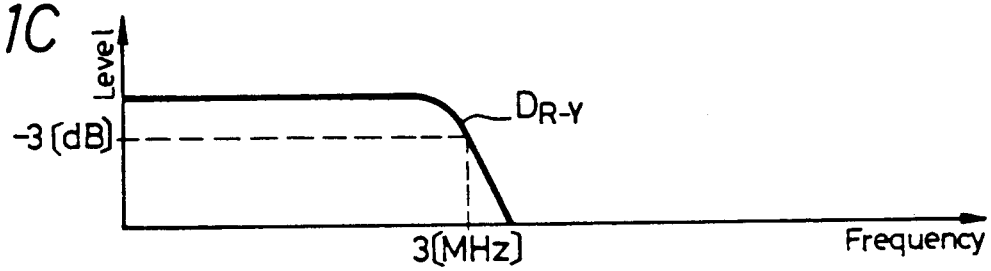

The present invention will hereinafter be described with reference to the drawings.

FIGS. 2A to 2D generally illustrate a format of 4:4:4:4 type digital video signal processing according to the present invention. Referring to FIGS. 2A to 2D, digital video data $DG_{VD}$ is formed of a video signal, a luminance signal Y sampled at a frequency of, for example, 13.5 MHz and two difference chrominance signals B-Y and R-Y sampled at the same frequency, 13.5 MHz. A digital signal $DG_Y$ is formed of the luminance signal. Digital signals $DG_{B-Y}$ and $DG_{R-Y}$ are formed of the difference chrominance signals B-Y and R-Y, respectively. The signals $DG_Y$, $DG_{B-Y}$, and $DG_{R-Y}$ are recorded on a magnetic tape (not shown) in the 6 MHz signal band.

In a case of the 4:4:4:4 type format digital video signal processing, a special effect key signal formed of a video signal similar, for example, to a black and white signal also is sampled at frequency of 13.5 MHz (the same as that of the luminance signal or the like) as an independent video signal which is different from the video signal. A digital signal $DG_{KEY}$ formed of the resultant key signal is recorded on the magnetic tape in the frequency band of 6 MHz (the same as that of the luminance signal.) Thus, the format of so-called 4:4:4:4 type digital video signal processing is formed relative to the format of 4:2:2 type digital video signal processing.

The video data $DG_{VD}$ of the format of the 4:4:4:4 type digital video signal processing has a data amount twice as large as that of the video data $D_{VD}$ of the format of 4:2:2 type digital video signal processing.

In this embodiment, as shown in FIGS. 4 and 5, the video data $DG_{VD}$ of the format of 4:4:4:4 type digital video signal processing is divided to provide a 4:2:2 main signal system $DG_{MAIN}$ and a 4:2:2 sub signal system $DG_{SUB}$ each corresponding to the format for 4:2:2 type digital video signal processing.

The 4:2:2 main signal system $DG_{MAIN}$ is comprised of the digital signal $DG_Y$ formed of the luminance signal and of the digital signals $DG_{(B-Y)L}$ and $DG_{(R-Y)L}$ formed of the low frequency components of two difference chrominance signals, respectively. The 4:2:2 sub signal system $DG_{SUB}$ is comprised of the digital signal $DG_{KEY}$ formed of the key signal and digital signals $DG_{(B-Y)H}$ and $DG_{(R-Y)H}$ which result from down-converting the high frequency components of the two difference chrominance signals.

As described above, the video data $DG_{VD}$ of the 4:4:4:4 type format digital video signal processing is divided to provide the two digital data formed of the 4:2:2 main signal system $DG_{MAIN}$ and the 4:2:2 sub signal system $DG_{SUB}$ so that in the recording mode, for example, the signal systems are respectively recorded by two video tape recorders based on the format of 4:2:2 type digital video signal processing.

When recorded data of the 4:2:2 main signal system $DG_{MAIN}$ and the 4:2:2 sub signal system $DG_{SUB}$, recorded by the two digital video tape recorders, are synchronously reproduced and are digitally processed in a predetermined manner so as to be combined, the video data $DG_{VD}$ of the format of the 4:4:4:4 type digital video signal processing and the digital signal $DG_{KEY}$ formed of the key signal can be reproduced.

In order to obtain the 4:2:2 main signal system $DG_{MAIN}$ from the video data $DG_{VD}$ of the format of the 4:4:4:4 type digital video signal processing, it is enough that the frequency bands of the two difference chrominance signals are limited by a filter corresponding to the format of the prior-art 4:2:2 digital video signal processing.

When the 4:2:2 sub signal system $DG_{SUB}$ is obtained the video data $DG_{VD}$ of the format of the 4:4:4:4 type digital video data processing, with respect to the two difference chrominance signals, the digital signals $DG_{(B-Y)H}$ and $DG_{(R-Y)H}$ formed of the high frequency components of the two difference chrominance signals are recorded on the same band as those of the two difference chrominance signals of the 4:2:2 main signal system $DG_{MAIN}$. This is achieved by down-converting differences of digital signals formed of low frequency components of the two difference chrominance signals, i.e., the high frequency components of the two difference chrominance signals from the video signal $DG_{VD}$ of the format of the 4:4:4:4 type digital video data processing. Also, the digital signal $DG_{KEY}$ formed of the key signal is recorded on the same band as that of the digital signal $DG_Y$ formed of the luminance signal.

According to the above-mentioned method, the video data $DG_{VD}$ of the format of the 4:4:4:4 type digital video signal processing is divided to provide two digital signal systems based on the formats of the 4:2:2 type digital video signal processing formed of the 4:2:2 main signal system $DG_{MAIN}$ and the 4:2:2 sub signal system $DG_{SUB}$ and then recorded. In the reproducing mode the 4:2:2 main signal system $DG_{MAIN}$ and the 4:2:2 sub signal system $DG_{SUB}$ are combined. Therefore, it is possible to realize a method for recording and reproducing a video signal in which the digital video signal can be recorded and reproduced with ease by using the two prior-art digital video tape recorders based on the format of 4:2:2 type digital video signal processing without requiring a new digital video tape recorder.

Figure 3:
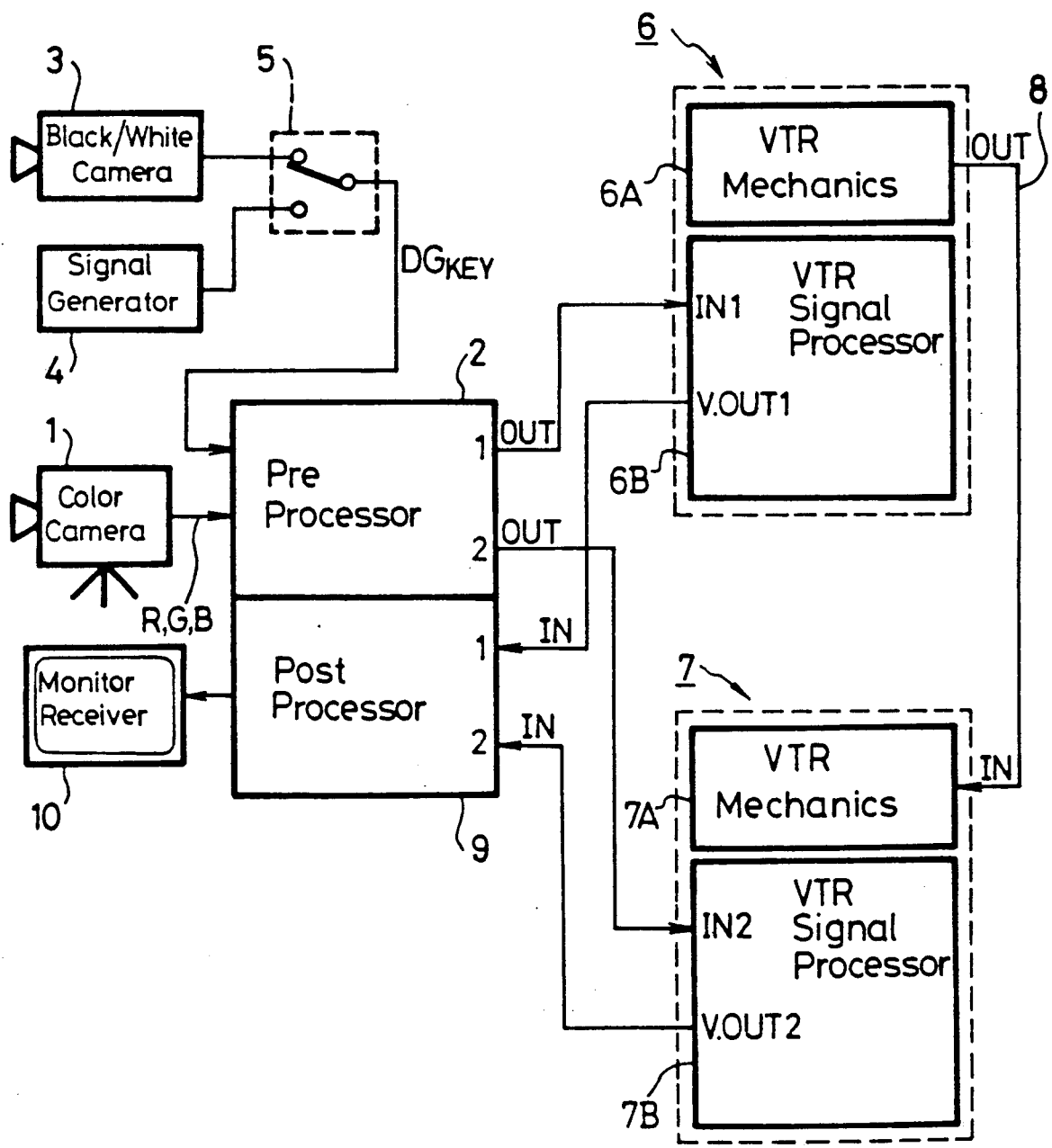
FIG. 3 is a block diagram showing an embodiment of an apparatus for recording and reproducing a digital video signal according to the present invention.

FIG. 3 shows an arrangement of a 4:4:4:4 type digital video tape recorder realizing the above-mentioned recording and reproducing method of the present invention.

Figure 2A:
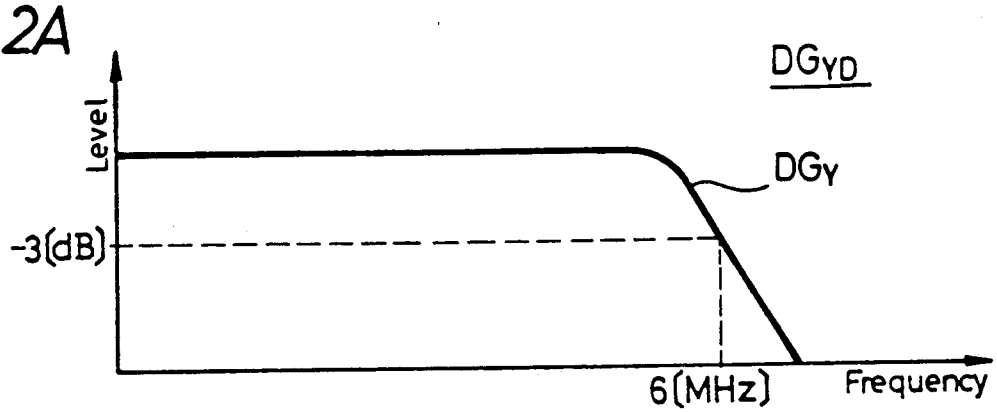
FIGS. 2A to 2D are characteristic diagrams of a format of 4:4:4:4 type digital video tape recorder according to the present invention, respectively.
Figure 2B:
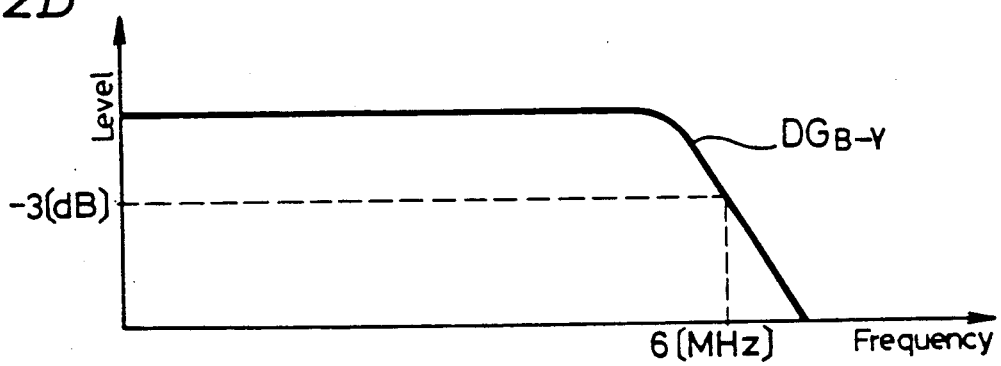
Figure 2C:
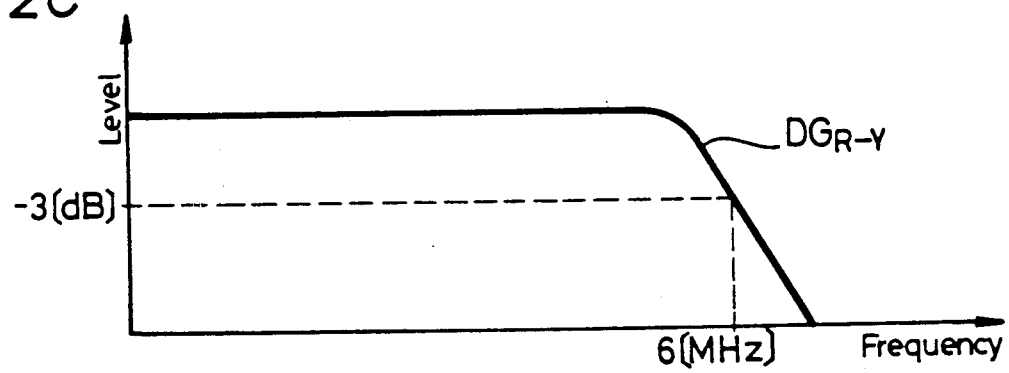
Figure 2D:
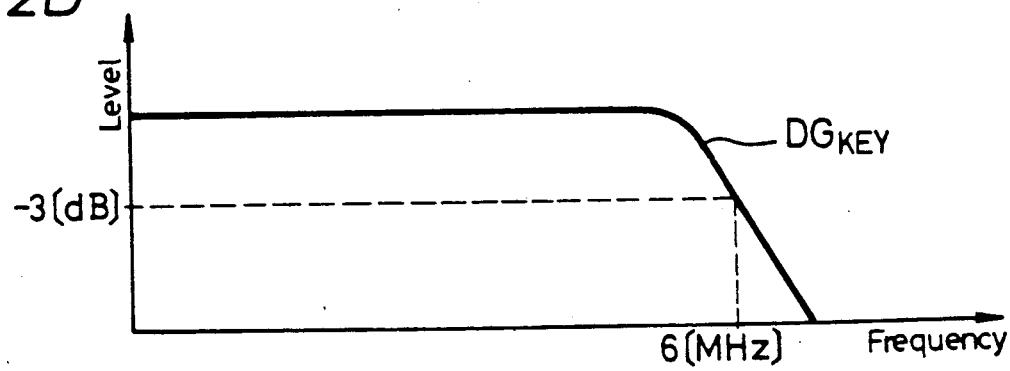

Referring to FIG. 3, it will be seen that a color video signal (formed of three primary color signals R, G and B in FIG. 3) of wide frequency band from a color video camera 1 is supplied to a pre-processor 2. A special effect key signal $DG_{KEY}$ formed of a video signal similar, for example, to a black and white signal from a black and white (monochrome) camera 3 is supplied through a switch 5 to the pre-processor 2 as an independent video signal different from the above-mentioned color video signal. Alternatively, a Telop signal, which is superimposed upon, for example, the video signal, from a signal generator 4 is selectively supplied through the above-mentioned switch 5 to the pre-processor 2 as the key signal independently of the above-mentioned special effect key signal. The frequency bands of the two key signals from the black and white camera 3 and the signal generator 4 are the same as that of the video signal from the color video camera 1. The video signal from the color video camera 1 is supplied to the pre-processor 2 as set forth above. The pre-processor 2 processes the video signal to provide the digital luminance signal $DG_Y$ and two digital difference chrominance signals and $DG_{B-Y}$, and $DG_{R-Y}$, each having a 6 MHz frequency band as shown in FIGS. 2A, 2B and 2C. The key signal from the black and white camera 3 or the signal generator 4 is supplied to the pre-processor 2 as described above and is thereby processed to provide a digital key signal $DG_{KEY}$ also having a 6 MHz frequency as shown in FIG. 2D.

The pre-processor 2 includes a digital low-pass filter and a digital high-pass filter, though not shown. The above-mentioned two digital difference chrominance signals $DG_{R-Y}$ and $DG_{B-Y}$ are supplied to the digital low-pass filter and to the digital high-pass filter, respectively. The digital low-pass filter extracts low-frequency components of the two digital difference chrominance signals $DG_{(B-Y)}$ and $DG_{(R-Y)}$ to form low band digital difference chrominance signals $DG_{(B-Y)L}$ and $DG_{(R-Y)L}$ each having a frequency band of 3 MHz, as shown in FIGS. 4B and 4C. The low band difference chrominance signals $DG_{(B-Y)L}$ and $DG_{(R-Y)L}$ and the above-mentioned signal $DG_Y$ are supplied together through an output terminal OUT1 of the pre-processor 2 to a conventional component digital video tape recorder (trade name: DVR-1000) 6 formed of a VTR mechanics portion 6A and a VTR signal processsor portion 6B, where they are recorded in the conventional 4:2:2 format. On the other hand, the digital high-pass filter in the pre-processor 2 is supplied with the digital difference chrominance signals $DG_{B-Y}$ and $DG_{R-Y}$ shown in FIGS. 2B and 2C, and generates the high band components of the digital difference chrominance signals $DG_{B-Y}$ and $DG_{R-Y}$ as its output signal. The pass frequency band of this digital high-pass filter is selected in a range of from 3 MHz to 6 MHz so that when the output signal of this high-pass filter is frequency-converted, high band digital difference chrominance signals $DG_{(B-Y)H}$ and $DG_{(R-Y)H}$ including the high band signal components of the digital difference chrominance signals $DG_{B-Y}$ and $DG_{R-Y}$ can be obtained as shown in FIGS. 5B and 5C. The high band digital difference chrominance signals $DG_{(B-Y)H}$ and $DG_{(R-Y)H}$ and the above-mentioned key signal $DG_{KEY}$ are taken as one set and fed from an output terminal OUT2 of the pre-processor 2 to another conventional component digital video tape recorder (trade name: DVR-1000) 7 formed of a VTR mechanics portion 7A and a VTR signal processor portion 7B, whereby it also is recorded, in the prior-art 4:2:2 format. Since the two component digital video tape recorders 6 and 7 are simultaneously operated to record the video signal as described above, the operations of the two video tape recorders 6 and 7 are synchronized. A synchronizing signal from the component digital video tape recorder 6 is supplied through a signal line 8 to the component digital video tape recorder 7.

Figure 4A:
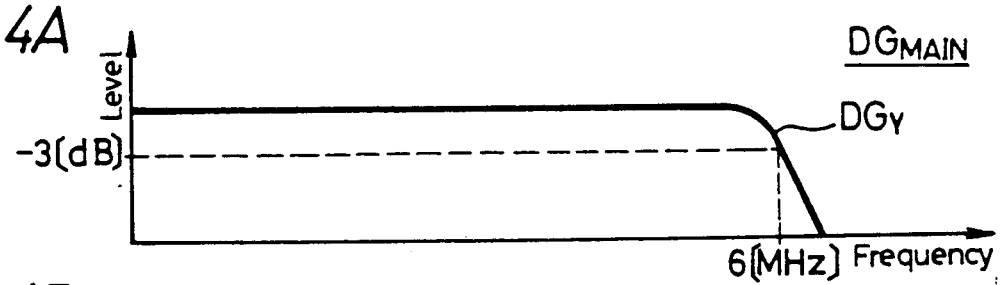
FIGS. 4A to 4C are schematic diagrams of a format of 4:2:2 main signal system, respectively.
Figure 4B:
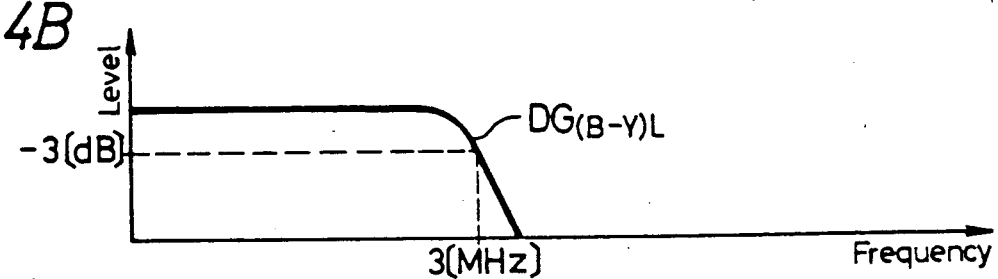
Figure 4C:
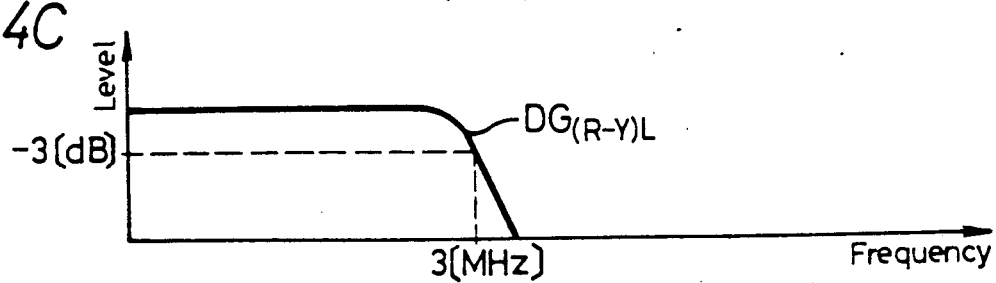

In the reproduction mode, the two component digital video tape recorders 6 and 7 are driven synchronously similar to the synchronous operation in the recording mode, whereby the component digital video tape recorder 6 supplies from its output terminal V.OUT1 the reproduced digital luminance signal $DG_Y$ and the reproduced low band digital difference chrominance signals $DG_{(B-Y)L}$ and $DG_{(R-Y)L}$ shown in FIGS. 4A, 4B and 4C to an input terminal of a post processor 9. Simultaneously, another component digital video tape recorder 7 supplies from its output terminal V.OUT2 the reproduced digital key signal $DG_{KEY}$ and the reproduced high band digital difference chrominance signals $DG_{(B-Y)H}$ and $DG_{(R-Y)H}$ shown in FIGS. 5A, 5B and 5C, to the other input terminal 2 of the post-processor 9. The incoming two sets of the reproduced signals are processed by the post-processor 9 in an opposite manner to that of the pre-processor 2 to form the digital luminance signal $DG_Y$, the digital difference chrominance signals $DG_{(B-Y)}$, $DG_{(R-Y)}$ and the digital key signal $DG_{KEY}$, each having the 6 MHz frequency band as shown in FIGS. 2A to 2D. The digital reproduced video signal thus made is converted by the post-processor 9 into a signal having a format suitable for a monitor receiver 10 and is fed to the monitor receiver 10.

In FIG. 6, reference numeral 20 generally designates a magnetic tape for another embodiment of a digital video tape recorder according the present invention. On the magnetic tape 20, the video data $DG_{VD}$ of a 4:4:4:4 format digital video tape recorder is divided as two digital data systems, including 4:2:2 main signal system $DG_{MAIN}$ and 4:2:2 sub signal system $DG_{SUB}$, and are recorded. In FIG. 6, reference letter a represents the head motion and reference letter b represents the tape motion.

More specifically, the 4:2:2 main signal system $DG_{MAIN}$ of the video data $DG_{VD}$ of the 4:4:4:4 format digital video tape recorder is recorded on main recorded tracks $TR_{M1}$, $TR_{M2}$, ..., as formed on recorded tracks TK1, TK2, ..., formed by the magnetic recording format of the 4:2:2 type digital video tape recorder by a main recording head 30, which is the same as that of the conventional 4:2:2 type digital video tape recorder with non-azimuth fashion.

The 4:2:2 sub signal system $DG_{SUB}$ of video data $DG_{VD}$ of the 4:4:4:4 format digital video tape recorder is recorded on sub recorded tracks $TR_{S1}$, $TR_{S2}$, ..., formed on guard band areas GB between the recorded tracks TK1, TK2, ... formed by the magnetic recording format of the 4:2:2 type digital video tape recorder by a sub recording head 40 which is delayed from the main recording head 30 by a predetermine angle in an azimuth recording fashion.

In this embodiment, according to the magnetic recording format of the 4:2:2 type digital video tape recorder, the recorded tracks TK1, TK2, ... having a width of 35 micrometers and having no azimuth angle are formed with the guard band area GB of 10 micrometer thickness by the main recording head 30 having a head width of 35 micrometers. Whereas, the sub recorded tracks $TR_{S1}$, $TR_{S2}$, ..., having track width of 22.5 micrometers are formed on the guard band areas GB having a width of 10 micrometers by the sub recording head 40 having a head width of 22.5 micrometers so as to have an azimuth angle of, for example, 20 degrees relative to the recorded tracks TK1, TK2, ... Thus, in a case of this digital video tape recorder, the main recorded tracks $TR_{M1}$, $TR_{M2}$, ..., having the track width of 22.5 micrometers and the sub recorded tracks $TR_{S1}$, $TR_{S2}$, ..., having the track width of 22.5 micrometers are alternately formed on the magnetic tape 20.

The video data D of the format of the 4:4:4:4 type digital video tape recorder thus recorded on the magnetic tape 20 is reproduced by using a main reproducing head and a sub reproducing head arranged in correspondence with the main recording head and the sub recording head of the digital video tape recorder, and the 4:2:2 main signal system $DG_{MAIN}$ and the 4:2:2 sub signal system $DG_{SUB}$ of the video data $DG_{VD}$ of the format of the 4:4:4:4 type digital video tape recorder are combined to provide the video data $DG_{VD}$ of the format of the 4:4:4:4 type digital video tape recorder as shown in FIG. 2.

As described above, this digital video tape recorder can record and reproduce the video data in which the red, green and blue color signals R, G and B are arranged to have an equivalent characteristic and having very high image quality as compared with the prior art. Simultaneously, this digital video tape recorder can obtain the key signal, thus enhancing an effect by the special effect of picture more.

Since the video data of the 4:2:2 main signal system $DG_{MAIN}$ recorded on the main recorded tracks $TR_{M1}$, $TR_{M2}$, ..., correspond to the video data $D_{VD}$ of the conventional 4:2:2 type digital video tape recorder format, the video data $D_{VD}$ of the 4:4:4:4 type digital video tape recorder format recorded on the magnetic tape 20 can be reproduced by the digital video tape recorder based on the 4:2:2 type digital video tape recorder format and can be obtained as the video data $D_{VD}$ of the 4:2:2 type digital video tape recorder format.

In this case, in the digital video tape recorder based on the 4:2:2 type digital video tape recorder, the reproducing head corresponds to the non-azimuth recording so that the video data of the 4:2:2 sub signal system $DG_{SUB}$ recorded on the sub recorded tracks $TR_{S1}$, $TR_{S2}$, ..., of the magnetic tape 20 can hardly be reproduced in practice due to the azimuth loss.

According to the above-mentioned arrangement, since the video data of the 4:2:2 main signal system $DG_{MAIN}$ is recorded on the recorded tracks TK1, TK2, ..., of the magnetic tape 20 based on the 4:2:2 type digital video tape recorder format in a non-azimuth recording fashion and the video data of the 4:2:2 sub signal system $DG_{SUB}$ is recorded on the guard band areas GB of the magnetic tape 20 based on the 4:2:2 type digital video tape recorder format in an azimuth recording fashion, it is possible to realize the digital video tape recorder based on the 4:4:4:4 type digital video tape recorder format compatible with the conventional 4:2:2 type digital video tape recorder format and have a recording capacity twice as large as that of the prior art and produce the key signal for special effect.

While the 4:2:2 sub signal system is recorded on the guard band area of the magnetic tape based on the magnetic recording format of the 4:2:2 type digital video tape recorder with the azimuth angle of 20 degrees as described above to form the sub recorded track, the azimuth angle is not limited to 20 degrees, but may be as 15 degrees, 25 degrees and so on.

In place of the azimuth recording for the non-azimuth recording on the main recorded tracks, it is possible that, for example, the coding is made on the main recorded track in accordance with a scrambled non-return to zero (scrambled NRZ) system, while the coding may be carried out in accordance with other coding systems such as an eight-to-fourteen modulation (EFM) system or the like to thereby form the sub recorded tracks.

While in the above-mentioned embodiment the sub recording head is overlapped on the tape running side edge portion of the recorded track based on the 4:2:2 type digital video tape recorder format by 12.5 micrometers thereby forming the sub recorded tracks, the sub recording head alternatively may be overlapped on the main recorded tracks at both sides of the tracing direction of the sub recording head by 6.75 micrometers in such a manner that the track center of the recorded track of the 4:2:2 type digital video tape recorder and the track center of the main recorded track based on the 4:4:4:4 type digital video tape recorder format may coincide with each other.

While the special effect key signal formed of the black and white signal having the same data amount to that of, for example, the luminance signal is used as the independent video signal different from the video signal, other video signals may be recorded and used as the above-mentioned key signal.

According to the first embodiment of the present invention, as described above, when the digital signal formed of the luminance signal and two difference chrominance signals of the video signal and the independent video signal different from the video signal is recorded, the digital signal is divided to provide the first digital signal system based on the signal processing format of the 4:2:2 type digital video tape recorder and the second digital signal system upon reproduction, the first and second digital signal systems are combined, whereby without providing the new digital video tape recorder, it is possible to realize a method of recording and reproducing a video signal in which the digital video signal can be recorded and reproduced by using the conventional two digital video tape recorders based on the 4:2:2 type digital video tape recorder format.

Further, according to the second embodiment of the present invention, since the first digital signal system is recorded on the recorded tracks of the magnetic tape based on the magnetic recording format of the 4:2:2 type digital video tape recorder and the second digital signal system is recorded on the guard band areas of the magnetic tape based on the magnetic recording format of the 4:2:2 type digital video tape recorder, it is possible to realize the digital video tape recorder having a compatibility with the conventional 4:2:2 type digital video tape recorder format and which has a recording capacity twice as large as that of the conventional digital video tape recorder.

It should be understood that the above description is presented by way of example on the preferred embodiments of the invention and it will be apparent that many modifications and variations thereof could be effected by one with ordinary skill in the art without departing from the spirit and scope of the novel concepts of the invention so that the scope of the invention should be determined only by the appended claims.

I claim as my invention:

1. A method for recording and reproducing a color video signal having a luminance and a plurality of difference chrominance signals each having a frequency band width equivalent to that of the luminance signal, and an independent video signal which is different from the color video signal, comprising the steps of:

dividing each of said plurality of difference chrominance signals so as to obtain respective low and high frequency components;

generating a first video signal including said luminance signal and said low frequency component of each of said plurality of difference chrominance signals, and a second video signal including the independent video signal and said high frequency component of each of said plurality of difference chrominance signals;

recording said first and second video signals by means of first and second video tape recorders, respectively, which are synchronously driven;

reproducing said first and second video signals by means of said first and second video tape recorders, respectively; and combining the reproduced first and second video signals so as to regenerate said color video signal and said independent video signal.

2. An apparatus for recording and reproducing a color video signal having a luminance signal and a plurality of difference chrominance signals having a frequency band equivalent to the frequency band of the luminance signal, and an independent video signal which is different from the color video signal, comprising:

means for dividing a frequency band of each of the plurality of difference chrominance signals to generate first and second sets of difference chrominance signals, the first set including a low frequency component of each of the plurality of difference chrominance signals and the second set including a high frequency component of each of the plurality of difference chrominance signals;

means for generating a first video signal having the luminance signal and the first set of difference chrominance signals and a second video signal having the independent video signal and the second set of difference chrominance signal;

first and second video tape recorders for recording and reproducing the first and second video signals, respectively; and means for combining the first and second video signals reproduced by said first and second video tape recorders, respectively.

3. The apparatus according to claim 2, in which said first video signal and said independent video signal are digital video signals.

4. The apparatus according to claim 3, in which said first and second video tape recorders are 4:4:2 type digital component video tape recorders.

5. The apparatus according to claim 4, in which said first and second video tape recorders are driven synchronously.

6. The apparatus according to claim 5, in which said independent video signal is a monochrome video signal.

7. The apparatus according to claim 6, in which a frequency band of said luminance signal, said plurality of difference chrominance signals and said independent video signal is 6 mega-hertz (MHz).

8. An apparatus for recording and reproducing a color video signal having a luminance signal and a plurality of difference chrominance signals having a frequency band which is equivalent to the frequency band of the luminance signal, and an independent video signal which is different from the color video signal, comprising:

means for dividing a frequency band of each of the plurality of difference chrominance signals to generate first and second sets of difference chrominance signals, the first set including a low frequency component of each of the plurality of difference chrominance signals and the second set including a high frequency component of each of the plurality of difference chrominance signals;

means for generating a first video signal having the luminance signal and the first set of difference chrominance signals and a second video signal having the independent video signal and the second set of difference chrominance signals;

a video tape recorder for recording and reproducing the first and second video signals on a magnetic tape; and means for combining the first and second video signals reproduced by said video tape recorder; said video tape recorder including a rotary drum having first and second recording heads and reproducing heads so that said first video signal is recorded on the magnetic tape by said first recording head to produce successive oblique first video tracks with a guard band area between successive first video tracks and so that said second video signal is recorded on said guard band area on the magnetic tape by said second recording head as second video tracks, wherein said first and second video signals are reproduced by said first and second reproducing heads, respectively.

9. The apparatus according to claim 8, in which said first video tracks have a different azimuth angle than the azimuth angle of said second video tracks.

10. A method for recording and reproducing a color video signal having a luminance signal and a plurality of difference chrominance signals each having a frequency band width equivalent to that of the luminance signal, and an independent video signal which is different from the color video signal, comprising the steps of:

dividing each of said plurality of difference chrominance signals so as to obtain respective low and high frequency components;

generating a first video signal including said luminance signal and said low frequency component of each of said plurality of difference chrominance signals, and a second video signal including the independent video signal and said high frequency component of each of said plurality of difference chrominance signals;

recording and reproducing said first and second video signals by means of a video tape recorder;

combining the reproduced first and second video signals so as to regenerate said color video signal and said independent video signal.

11. The method according to claim 10, in which the video tape recorder includes a rotary drum having first and second recording heads and first and second reproducing heads for recording and reproducing said first and second video signals, respectively, on a magnetic tape, the recording of said first video signals producing successive oblique first video tracks on said magnetic tape with a guard band area between said successive tracks, said second video signals being recorded on said guard band area.

* * * * *